May 10, 1927.
N. BERG
PULLEY
Filed June 18, 1925  3 Sheets-Sheet 1
1,628,220
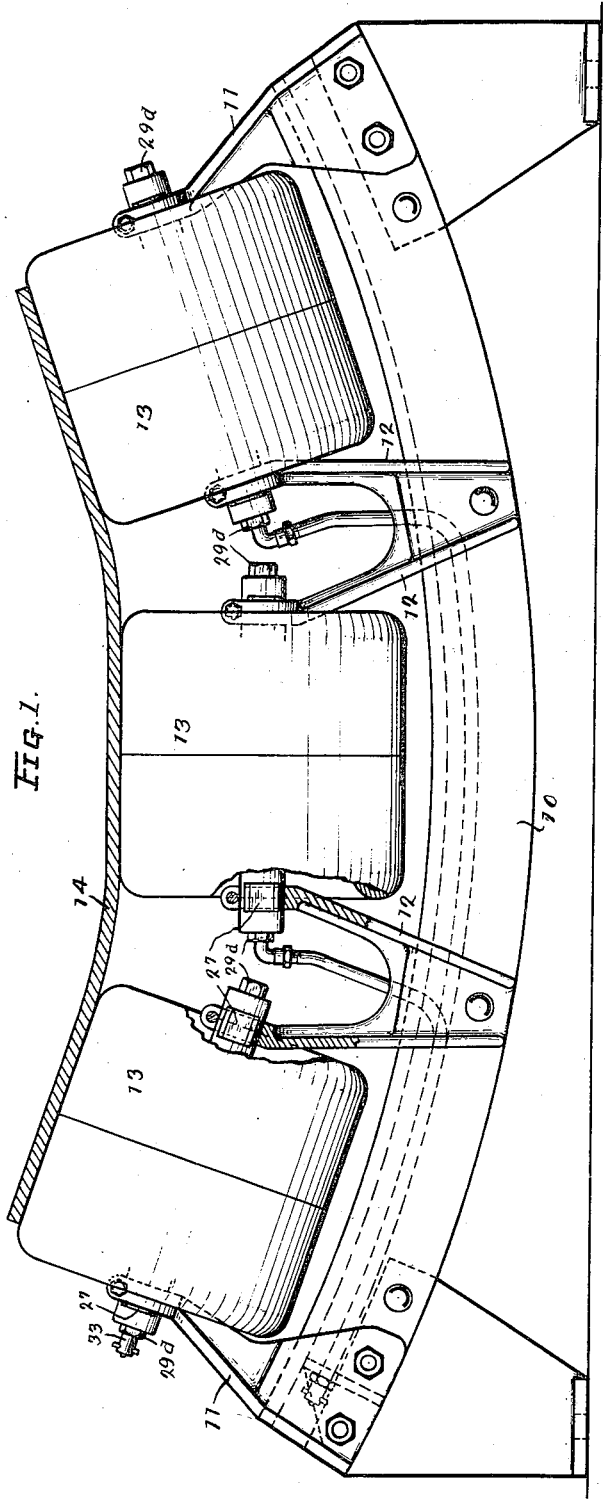
INVENTOR.
Nanstad Berg
By Geo. T. Pitts
ATTORNEY May 10, 1927.
N. BERG
1,628,220
PULLEY
Filed June 18, 1925   3 Sheets-Sheet 2
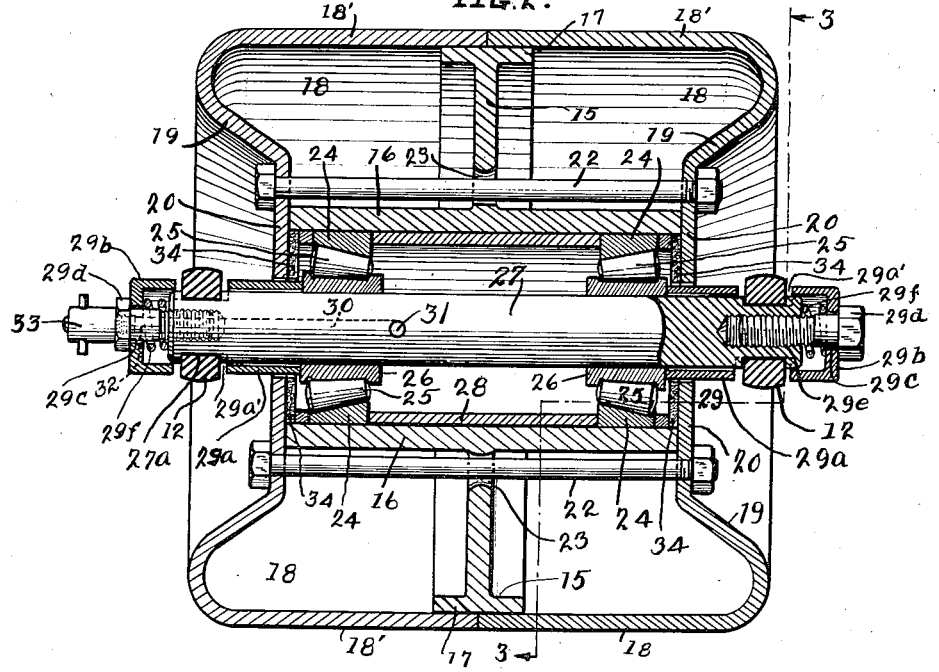
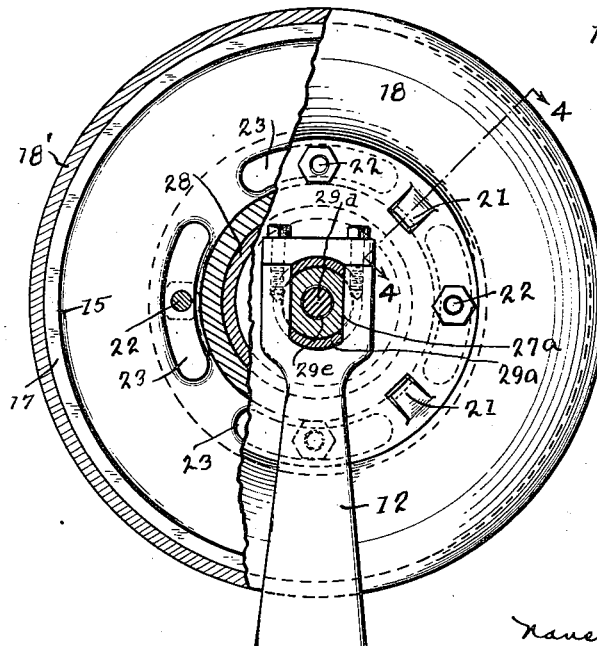
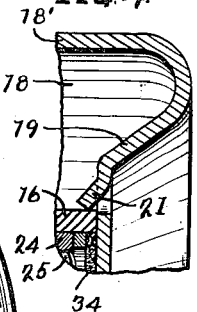
INVENTOR
Nansteg Berg
By Geo B Pitts
ATTORNEY May 10, 1927.
N. BERG
1,628,220
PULLEY
Filed June 18, 1925   3 Sheets-Sheet 3
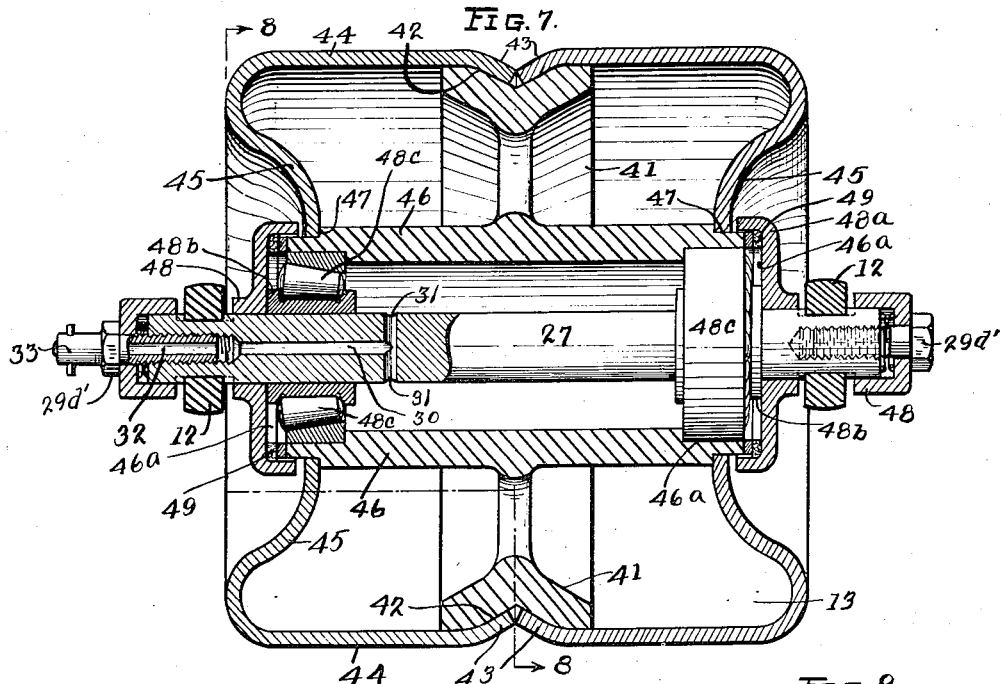
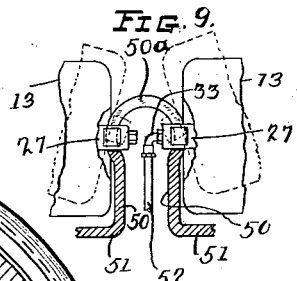
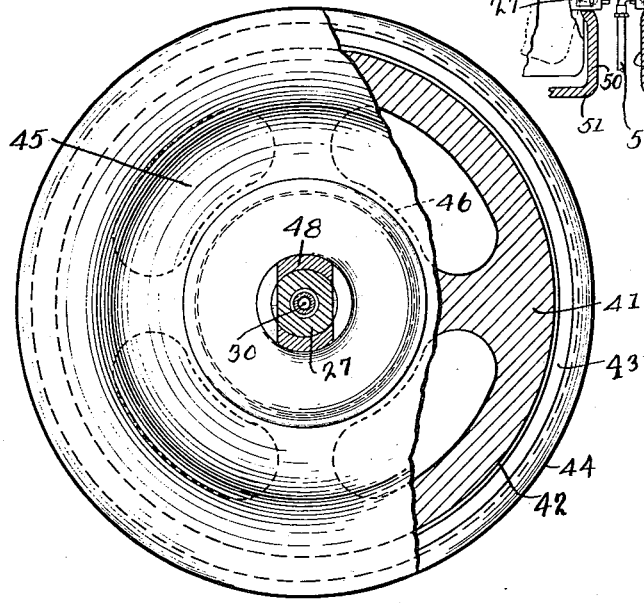
INVENTOR
Naustad Berg
By Fred B Pitts
ATTORNEY Patented May 10, 1927.

1,628,220

UNITED STATES PATENT OFFICE.

NANSTAD BERG, OF CLEVELAND, OHIO, ASSIGNOR TO BERG MANUFACTURING COMPANY, OF CLEVELAND, OHIO, A COPARTNERSHIP COMPOSED OF ANDREW C. DENISON AND NANSTAD BERG.

PULLEY.

Application filed June 18, 1925. Serial No. 37,961.

The present invention relates to improvements in pulleys and mountings therefor, more particularly to pulleys of the type used in conveyors of the belt or other type.

One object of the invention is to provide a strong and durable pulley which may be economically manufactured and assembled, and one which may be easily adjusted or assembled into the desired position.

Another object of the invention is to provide improved means for adjusting the bearings for the pulley.

Another object of the invention is to provide a pulley comprising a hub and a spider portion and a pair of shells which are mounted on the hub and spider portion in a novel manner to insure rigidity and strength and to produce a compact structure.

Another object of the invention is to provide, in a belt pulley having sheet metal shells for its belt engaging surface, improved means for supporting and connecting the circumferential ends of the shells, whereby strains due to large lumps of material falling on or conveyed by the belt will be resisted without distorting the shell or affecting its running.

A further object of the invention is to construct an improved pulley in which a rigid support for the bearings is provided to maintain them in alignment so that in the event the pulley shell becomes distorted, the running of the pulley will not be affected.

The invention further aims at the provision of a novel bracket for supporting the adjacent ends of adjacent pulleys, so that the latter may be disposed in proper relative angular positions, and wherein the supporting brackets may be made from stock material and can be made substantially in one piece.

Other objects of the invention will be apparent to those skilled in the art to which my invention relates from the following description taken in connection with the accompanying drawings, wherein Figure 1 is a transverse section through a conveyor of the belt type showing a plurality of pulleys constructed according to the present invention and applied thereto.

Figure 2 is a detail longitudinal section, enlarged, taken through a pulley constructed according to the present invention.

Figure 3 is an end elevation of the same, partly broken away showing the connections for holding the shells upon the hub.

Figure 4 is a fragmentary enlarged sectional view taken through one end of the pulley near the periphery thereof, and showing one of the centering tongues for supporting the shells in true concentric position upon the spider.

Figure 5 is a transverse fragmentary section taken through the peripheral portion of a pulley showing a modified construction of the spider and shells for holding the same in interlocked position.

Figure 6 is a section taken at right angles to the axis of the pulley on the line 6—6 of Figure 5.

Figure 7 is a longitudinal sectional view through a pulley, showing another modified construction of the same.

Figure 8 is an end view thereof, and

Figure 9 is a detail view in section showing a modified form of bracket for supporting adjacent pulley ends, the dotted lines showing the pulleys arranged at an angle one to the other.

Referring to the drawings, the improved pulleys are illustrated in Figure 1 as applied to a belt conveyor, whereby the latter is supported in a trough-like shape while running over the pulleys, but it is to be understood that the pulley may be used in connection with other types of conveyors and may also be used in various other capacities wherein a light, yet strong supporting pulley is required. The conveyor is shown in Figure 1 as having a transversely curved frame 10 provided with end brackets 11 and intermediate brackets 12, the latter each having a pair of arms adapted to cooperate with the adjacent arms of other intermediate brackets and with the end brackets 11 to form supports for the pulleys 13, as shown. The conveyor belt 14 is mounted upon the pulleys 13 and the latter are disposed in angular relation with respect to each other, so as to hold the belt 14 in substantially concaved shape to carry granular or other material over a series of the pulley sets such as shown in Figure 1.

The pulley comprises a spider 15 of web form extending outwardly and about a hub 16 which is of considerable length, and the spider 15 is arranged mid-way between the ends of the hub and carries a flat peripheral band or head 17 which may be smooth on its peripheral surface, as shown in Figure 2, for a purpose which will later appear. 18 indicates a pair of shells, preferably of similar shape, which co-operate to form the pulley rim or wall on which the belt 14 runs. Each shell comprises an annular wall 18' and an inwardly turned side or end wall 19, terminating in an annular flange 20 adapted to engage or lie against the opposite ends of the hub 16 for closing the ends of the latter and for strengthening and reinforcing the shells 18. At suitably spaced points the end walls 19 are slitted to form tongues 21, which are bent inwardly so that their free ends will engage the outer surface of the hub 16 (see Figs. 3 and 4), in order to center the shells 18 upon the hub 16 and to prevent distortion of the shells incident to pressure, handling and the like. The end walls 19 are held together and clamped to the opposite ends of the hub 16 by through-bolts 22 which have heads engaging the exterior surfaces of the flange 20 at one end and provided with clamping nuts on their other ends adapted to engage the exterior surfaces of the opposite flange 20. The spider 15 is provided with slots or perforations 23 through which the bolts 22 may freely pass, as shown in Figs. 2 and 3.

Within the hub 16, in each end thereof, is placed an outer cone ring 24 of tapered construction to accommodate thereagainst tapered rollers 25. The tapered rollers are supported upon an inner cone ring 26, which is mounted upon a stationary spindle 27. The spindle 27 extends outwardly in opposite directions through the ends of the pulley for engagement with the brackets 11, 12. A spacing sleeve 28 of suitable length is fitted within the hub 16 between the outer cone rings 24 and engages therewith to hold the same in spaced relation, while the inner rings 26 are suitably flanged at opposite ends for engaging the ends of the rollers 25 and maintaining the cone rings 24 and 26 in proper alignment. The spindle 27 is supported at its opposite ends by the bracket 11—12 or 12—12, as the case may be, for rotatably supporting the pulley, and for this reason the spindle 27 at each end is flattened and reduced at opposite sides as shown at 27$^a$ in order to fit in the bracket arms 12 without turning, this arrangement serving to prevent endwise as well as rotative movement of the spindle. 29 indicates as an entirety means for moving each inner cone for adjusting the adjacent bearing. Of these means, 29$^a$ indicates a sleeve member fitting over each end of the spindle 27 and engaging at its inner end the adjacent inner cone 26 and arranged to move or slide endwise on the spindle 27, and having a cap on its outer end (preferably formed integrally therewith) and formed with an opening 29$^c$ preferably disposed axially of the sleeve. 29$^d$ indicates a screw extending through the opening 29$^c$ and engaging screw threads in opening 29$^e$ extending inwardly in an axial direction from the free end of the spindle. As shown the head of the screw 29$^d$ engages the cap 29$^b$ and through the latter serves to move the sleeve member 29$^a$ inwardly to adjust the bearing cone 26 and thereby take up for wear in the bearings. 29$^f$ indicates a spring interposed between each cap 29$^b$ and the adjacent end of the spindle 27, the purpose of the spring being to maintain the sleeve member outwardly against the screw head, thereby preventing it from moving inwardly beyond its adjusted position, and co-operating with the screw head to effect adjustment of the sleeve member 29$^a$ when the screw is turned to move the head outwardly. To permit of the endwise movement or adjustment of the sleeve member 29$^a$ without interfering with the arms of the brackets 11 and 12, the sleeve member is slotted at its opposite sides as shown at 29$^{a'}$.

The adjustment means 29 are provided at both ends of the pulley, but one of them is modified to provide for the supply of the lubricant within the sleeve for the bearings 24, 25, 26. For this purpose one of the openings 29$^e$ is extended inwardly to form an oil duct 30 which connects at its inner end with one or more ports 31 which open through the side of the spindle and into the chamber formed between the spaced bearings. The adjusting screw 29$^d$ that engages the adjacent cap 29$^b$ is made hollow, as shown at 32, and is extended beyond the head 29$^d$, as shown at 33, and provided with a valved port of any desired construction whereby the lubricant may be caused to flow through the openings 32, 29$^e$ and ducts 30, 31. A suitable packing ring or disk 34 is placed against the inner side of each flange 20 to seal the oil space so that the lubricant may be maintained within the hub 12.

In the modification shown in Figures 5 and 6 the casing sections or shells 35 are fitted over a spider 36 formed with an annular peripheral channel 37 having opposed substantially right angular side walls 38, and the shells 35 are provided near their inner edge portions with stamped lugs or tongues 40. The lugs 40 are bent inwardly to project into the channel 37 and their free ends engage with the adjacent walls or shoulders 38. The tongues thus hold the shells 35 firmly upon the spider 36 and against outward movement.

In the modification shown in Figures 7 and 8 the spider 41 is provided with an annular, substantially V-shape groove 42 into which are rolled the inner edge portions 43 of the shells 44. The side or end walls 45 of the shells are of a size to fit over and engage the reduced opposite ends of the hub 46, the reduced ends of the hub providing shoulders 47 against which the inner marginal edges of the walls 45 bear. The sleeve members 48 and their adjusting means are similar to the sleeve members 29ª and their adjusting means, except that the inner end of each member 48 is provided with a flanged cap 48ª which fits over the adjacent end of the hub to close it, the caps 48ª being of sufficient diameter for this purpose. The inner ends of the sleeve members 48 engage the inner races 48ᵇ of the bearings 48ᶜ and serve to adjust them when moved inwardly by the rotation of the screw 29ᵈ′. One or more gaskets or packing rings 49 may be fitted in each cap 48ª for sealing the same against the adjacent end of the hub 46 and maintaining the lubricant about the roller bearings. In this form of construction I prefer to form in the inner walls of the hub 46 annular recesses 46ª to receive the outer races of the bearings 48ᶜ.

The modified form of bracket 50 as shown in Figure 9 comprises a section of metal flat stock, which is substantially U-shaped with laterally bent end portions or feet 51 for attachment to a frame, plate or the like (not shown). The intermediate portion of the bracket is preferably rounded and its legs are spaced so as to support the adjoining ends of the spindles 27 for two pulleys. The rounded upper portion of the bracket 50 is longitudinally slotted, as shown at 50ª to receive therein the oppositely faced and reduced portions of the spindle 27, the ends of the slot 50ª serving as seats for the spindles. By terminating the slot at different points about the curved portion of the bracket the spindles may be arranged at the desired angle (see dotted lines in Fig. 9) or in end to end relation.

As shown in Figure 9, the lubricant may be introduced through a pipe 52 to the high pressure connection 33 or the like and such connection may extend downwardly between the vertical arms of the bracket 50.

It will be noted that in all forms of the invention the shells are supported at their opposite ends upon the hub, and at their inner ends upon the band of the spider. This construction insures durability and prevents the sides and ends of either shell from becoming distorted. Furthermore, in the event the shell becomes bent at either or both ends, no disalignment of the bearings will result; hence the pulley will continue to run on the spindle 27. It will also be seen that the hub is formed integrally with the web or spider and that the inner portions of shells or sections may be secured to the latter in various ways to provide between them an effective connection which involves but few operations in the manufacture of the pulley.

It is obvious that various changes and modifications may be made in the detail of construction and design of the above specifically described embodiments of my invention without departing from the spirit and scope thereof, such changes and modifications being restricted only by the scope of the following claims.

What I claim is:

1. A pulley structure comprising a hub having intermediate its ends a spider terminating in an annular member, a pair of opposed shells having annular walls disposed in abutting relation and end walls, the abutting ends of said annular walls fitting over and supported on the annular member of said spider and said end walls being formed with openings through which said hub extends, and means for maintaining said shells in fixed relation to said annular member.

2. A pulley structure comprising a hub having intermediate its ends a spider terminating in an annular member, a pair of shells having end walls surrounding the outer portions of the hub and annular walls fitting and supported on said annular member, and means for securing the shells in fixed relation to said annular member.

3. A pulley structure comprising a hub having intermediate its ends a spider terminating in an annular member, a pair of opposed shells having end walls through which the outer portions of said hub extend and annular walls the ends of which engage with and are supported on said annular member, and means for securing the ends of said annular walls to said member to prevent lateral movement of said shells.

4. A pulley structure as claimed in claim 3 in which the securing means comprise an annular groove formed in the periphery of said member and portions of said annular walls are bent to engage the walls of the groove.

5. A pulley structure as claimed in claim 3 in which the securing means comprise a substantially V-shaped groove formed in the periphery of said annular member and the free ends of said annular walls are bent downwardly into engagement with the sides of said groove.

In testimony whereof, I have hereunto subscribed my name.

NANSTAD BERG.